(12) United States Patent
Alme et al.

(10) Patent No.: US 9,846,774 B2
(45) Date of Patent: Dec. 19, 2017

(54) SIMULATION OF AN APPLICATION

(71) Applicant: MCAFEE, LLC, Santa Clara, CA (US)

(72) Inventors: Christoph Alme, Paderborn (DE); Slawa Hahn, Paderborn (DE); Stefan Finke, Paderborn (DE)

(73) Assignee: McAfee, LLC, Santa Clara, CA (US)

( * ) Notice: Subject to any disclaimer, the term of this patent is extended or adjusted under 35 U.S.C. 154(b) by 62 days.

(21) Appl. No.: 14/752,911

(22) Filed: Jun. 27, 2015

(65) Prior Publication Data

US 2016/0378977 A1 Dec. 29, 2016

(51) Int. Cl.
| | | |
|---|---|---|
| *G06F 11/00* | (2006.01) | |
| *G06F 21/53* | (2013.01) | |
| *G06F 9/455* | (2006.01) | |
| *G06F 21/56* | (2013.01) | |
| *G06F 9/445* | (2006.01) | |
| *G06F 9/44* | (2006.01) | |

(52) U.S. Cl.
CPC ............ *G06F 21/53* (2013.01); *G06F 9/4423* (2013.01); *G06F 9/44521* (2013.01); *G06F 9/455* (2013.01); *G06F 21/566* (2013.01); *G06F 2221/033* (2013.01)

(58) Field of Classification Search
CPC ......... G06F 21/53; G06F 21/566; G06F 9/455
USPC ................................. 26/23; 726/23
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,460,050 B1 | 10/2002 | Pace et al. |
| 7,506,155 B1 | 3/2009 | Stewart et al. |
| 7,814,308 B2 * | 10/2010 | Templin ............... G06F 11/321 713/152 |
| 8,135,994 B2 * | 3/2012 | Keromytis .............. G06F 11/08 714/38.11 |
| 2010/0192223 A1 | 7/2010 | Ismael et al. |
| 2011/0307955 A1 | 12/2011 | Kaplan et al. |
| 2013/0007536 A1 * | 1/2013 | Feng ....................... G06F 8/456 714/45 |
| 2013/0055403 A1 * | 2/2013 | Pennington ............. G06F 21/53 726/25 |
| 2013/0086684 A1 * | 4/2013 | Mohler .................... G06F 21/53 726/24 |
| 2013/0097706 A1 * | 4/2013 | Titonis .................... G06F 21/56 726/24 |

(Continued)

FOREIGN PATENT DOCUMENTS

KR 100951852 B1 4/2010

OTHER PUBLICATIONS

International Search Report and Written Opinion in International Application No. PCT/US2016/033853 dated Sep. 13 2016, 13 pages.

*Primary Examiner* — Teshome Hailu
(74) *Attorney, Agent, or Firm* — Patent Capital Group

(57) ABSTRACT

Particular embodiments described herein provide for an electronic device that can be configured to identify an application, run the application, log the parameters for each function call of the application, and store the logged parameters in an emulation table. The logged parameters can include a function call, input parameters, and output parameters. The emulation table can be used to simulate execution of an application without having to actually run the application.

12 Claims, 7 Drawing Sheets

(56) References Cited

U.S. PATENT DOCUMENTS

2014/0173734 A1* 6/2014 Keromytis .............. G06F 11/08
            726/23
2015/0007312 A1  1/2015 Pidathala et al.

* cited by examiner

SIMULATION OF AN APPLICATION

TECHNICAL FIELD

This disclosure relates in general to the field of information security, and more particularly, to a simulation of an application.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
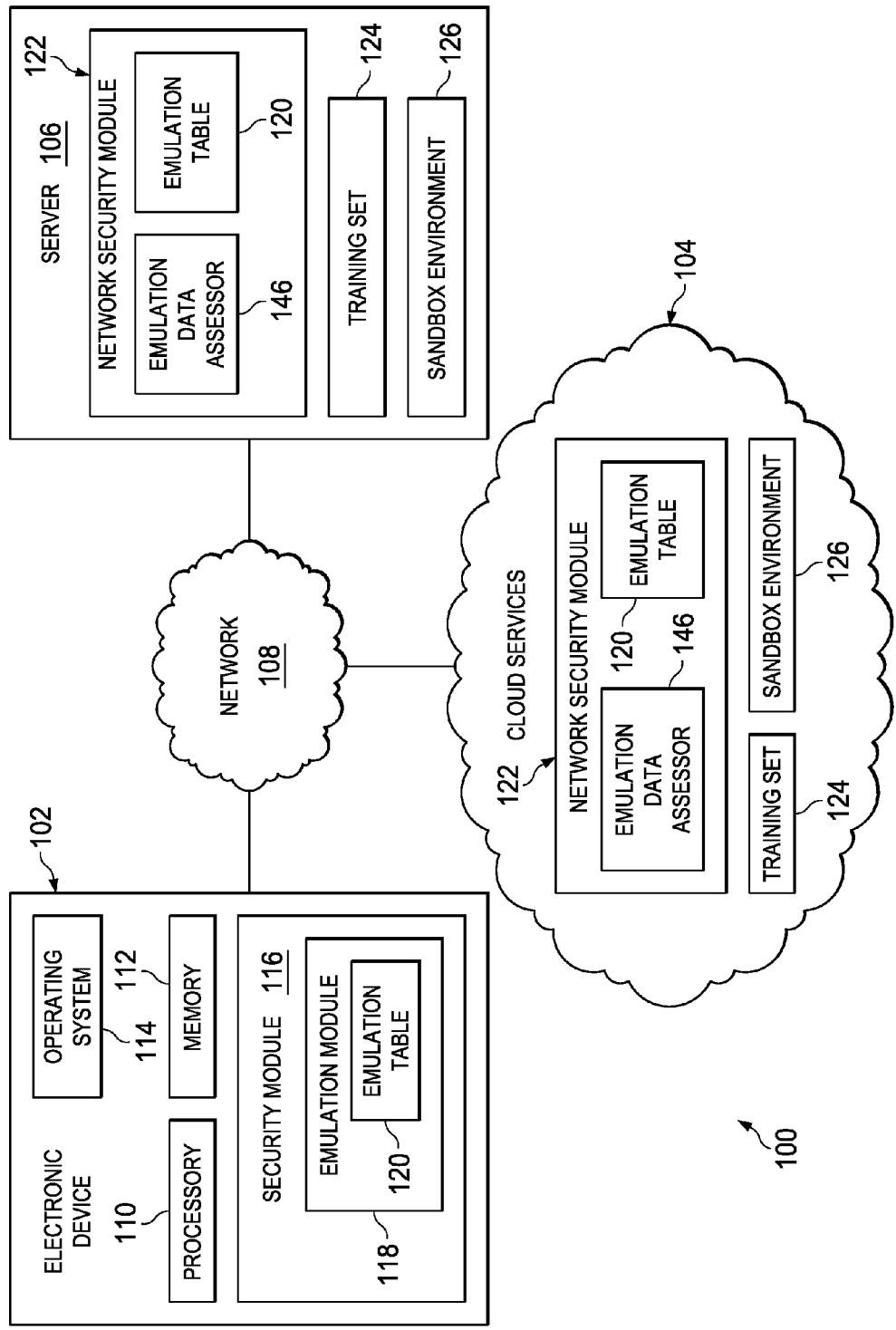
FIG. 1 is a simplified block diagram of a communication system for the simulation of an application in accordance with an embodiment of the present disclosure.

FIG. 1 is a simplified block diagram of a communication system 100 for the simulation of an application in accordance with an embodiment of the present disclosure. Communication system 100 can include an electronic device 102, cloud services 104, and a server 106. Electronic device 102 can include a processor 110, memory 112, an operating system (OS) 114, and a security module 116. Security module 116 can include an emulation module 118. Emulation module can include an emulation table 120. Cloud services 104 and server 106 can each include a network security module 122, a training set 124, and a sandbox environment 126. Network security module 122 can include a emulation data assessor 146 and emulation table 120. Electronic device 102, cloud service 104, and server 106 can each be in communication using network 108.

In example embodiments, communication system 100 can be configured to include a system to use data-mining and machine-learning strategies to automatically model the relevant simulation logic for a profiled operating environment. Communication system 100 can be configured to identify an application (e.g., from training set 124), run the application, log the parameters for each function call of the application, and store the logged parameters in an emulation table (e.g., emulation table 120). The logged parameters can include a function call, input parameters, and output parameters. In an example, communication system 100 can assess overall logging data and determine the most prevalent combinations of input to output parameter mappings per system function. Communication system 100 may also prune out any parameters that do not influence the output of the called function. The emulation table can include a mapping table per system function that can be interpreted at runtime by an emulation module in electronic device 102 and the emulation table can include a plurality of logged parameters for a plurality of function calls.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Some malware detection approaches heavily rely on the use of software emulation. That is, in order to determine whether a new software application contains potentially dangerous behaviors, a respective malware scanner would simulate the execution of the file in question within a safe, virtual, emulation environment. The intent is to both monitor what effects the executed file takes on the emulation environment, but also how the file looks like after emulation. For example, malicious Windows® executables are often runtime-packed or obfuscated, and only through emulation can the outer obfuscation shell be removed off the file.

In order to reasonably correctly simulate an environment, such as a Windows® OS or a web browser, the system must simulate the system functions that the OS or browser exposes to the software applications or script code. Currently, this is done manually by malware researchers. For example, whenever some known malware makes calls to certain system functions, the researcher who develops detection for that malware family, makes sure the emulation environment simulates that system function.

This approach of manually authoring the simulation of system functions is reactive, error prone, and expensive. The only known alternative today would be to license the original OS image and run the entire OS under emulation. This has very clear limitations, first and foremost, its high performance cost. What is needed is a system and method that can execute as manually authored simulation functions, but at the same time, is generated through the use of data mining and machine-learning.

A communication system for the simulation of an application, as outlined in FIG. 1, can resolve these issues (and others). Communication system 100 may be configured to profile large training sets of software applications in a monitored original real-world environment, track occurring system calls with their input and output parameters, determine the most prevalent combinations, and compute generalized simulation models that can be used by an emulation component to simulate a run of an application. A security module can analyze the simulate run for indications of malicious behavior from the application. For example, a behavioral malware classification system using a Markov model of behavior sequences may be used to analyze the file for malicious behavior.

In an example, communication system 100 can include a data-mining environment where applications can be executed safely on an original installation of the operating environment of interest such as Microsoft Windows®, or a Mozilla Firefox® browser and all system function calls that the monitored applications make to the operating environment, are logged. The system allows for a data-mining environment where software applications can be executed safely on an original installation of the OS in question, such as Microsoft Windows® or Mozilla Firefox® browser and all system function calls that the monitored applications or scripts make to the OS or browser are logged. For example, the monitored applications or scripts can be logged using kernel mode, user mode, browser DOM hooking, etc. The logged data can include the name and library of the system function, the actual input parameters passed into the functions, as well as output parameters returned from the function.

A machine-learning component can then assesses the logged data and determine the most prevalent combinations of input to output parameter mappings per system function. The system can also perform normalization to only those parameters that are relevant and produce a mapping table per system function. The mapping table can be send to an emulation module where at runtime, the emulation module can interpret these mapping tables, check whether a table entry's list of input parameter condition matches the current simulation environment state, and if so, perform the output actions encoded in that table entry. This process allows simulation of an application without having to actually run the application.

Further, the system can be configured to determine prevalent system calls automatically and not wait for an actual malware sample to start using a certain call. The performance characteristics for simulating a single system function is O(n) (n for list size), compared to O(m) (m for bytecode size) for manually authored simulation logic. In other words, assuming both list conditions and manual rule bytecode use comparable runtime interpreters, there is no additional performance impact incurred through the use of machine-learning generated system logic. While there is a higher initial one-time development cost for setting up the profiling backend environment and feeding the data-mining output into a machine-learning compiler, once that process is established, there is relatively no ongoing maintenance cost.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, cloud services 104, and server 106, and are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, cloud services 104, and server 106 can include memory elements for storing information to be used in the operations outlined herein. Each of electronic device 102, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, cloud services 104, and server 106 may include software modules (e.g., security module 116, emulation module 118, network security module 122, and emulation data assessor 146) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, cloud services 104, and server 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, or other similar devices. Cloud services 104 is configured to provide cloud services to electronic device 102. Cloud services may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although security module 116 is represented in FIG. 1 as being located in electronic device 102 this is for illustrative purposes only. Security module 116 could be combined or separated in any suitable configuration. Furthermore, security module 116 could be integrated with or distributed in another network accessible by electronic device 102 such as cloud services 104 or server 106.

Figure 2:
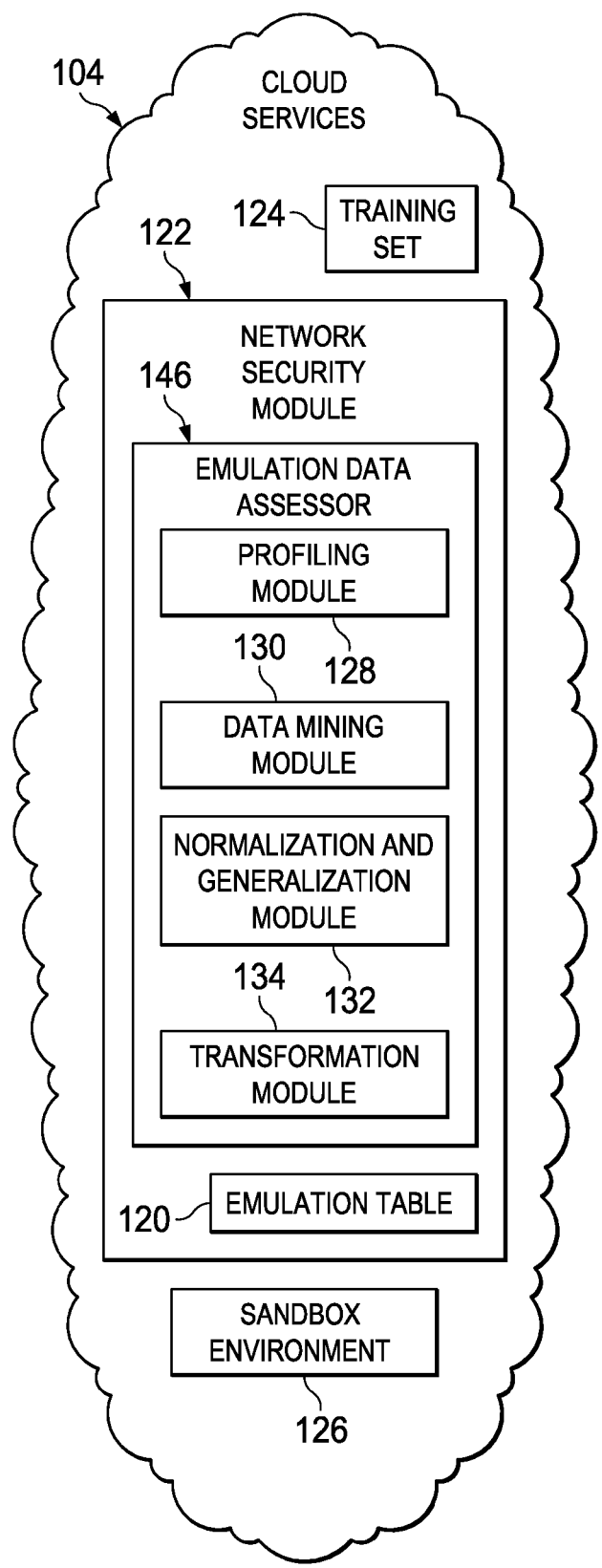
FIG. 2 is a simplified block diagram of a portion of a communication system for the simulation of an application in accordance with an embodiment of the present disclosure.

Turning to FIG. 2, FIG. 2 is a simplified block diagram of a portion of a communication system 100 for the simulation of an application in accordance with an embodiment of the present disclosure. Cloud services 104 (or server 106 or some other network element) can include network security module 122, training set 124, and sandbox environment 126. Network security module 122 can include emulation data assessor 146 and emulation table 120. Emulation data assessor 146 can include a profiling module 128, a data mining module 130, a normalization and generalization module 132, and a transformation module 134.

Training set 124 can include one or more applications that can be executed safely in sandbox environment 126. Sandbox environment 126 can include an original installation of an operating environment of interest such as Microsoft Windows®, a browser such as Mozilla Firefox®, or some other environment where an application may run. System function calls that a monitored application makes while in sandbox environment 126 are logged.

Profiling module 128 can be configured to log the data for each monitored call. The logged data can include the name and library of the system function, the actual parameters passed into the system functions (e.g., the top of the stack) referred to as input parameters, as well as parameters returned from the function (e.g., the EAX register), referred to as output parameters. Data mining module 130 can be configured to assess the overall logging data, determining the most prevalent combinations of input to output parameter mappings per system function. Normalization and generalization module 132 can be configured to prune out any parameters that obviously do not influence the output of the monitored function and to break down to only those parameters that are relevant. Transformation module 134 can be configured to transform the data from normalization and generalization module 132 into data that can be included in emulation table 120. The data in emulation table 120 can include a mapping table per system function that can be interpreted at runtime by emulation module 118 in electronic device 102 and, given a respective set of input parameter, allow the system to quickly lookup the output parameters that should be returned under a simulation of an application.

Figures 3, 4:
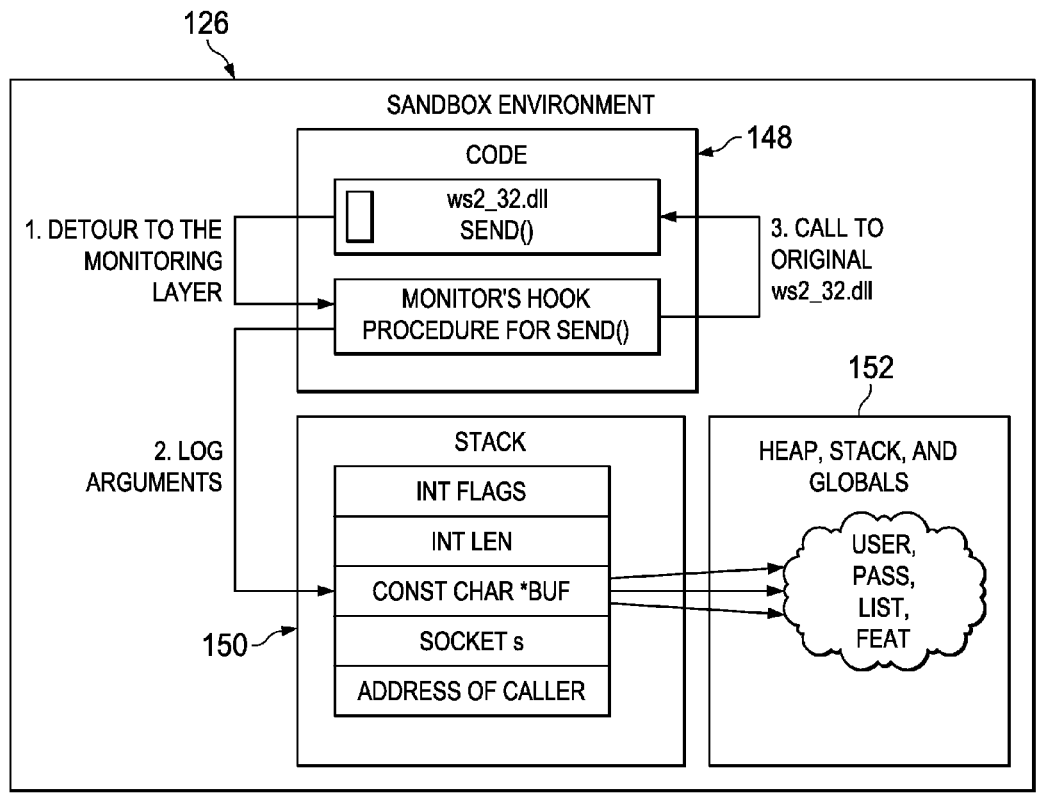
FIG. 3 is a simplified diagram of example details of a communication system for the simulation of an application in accordance with an embodiment of the present disclosure.
FIG. 4 is a simplified diagram of example details of a communication system for the simulation of an application in accordance with an embodiment of the present disclosure.

Turning to FIG. 3, FIG. 3 is a simplified diagram of a portion of communication system 100 for the simulation of an application in accordance with an embodiment of the present disclosure. FIG. 3 illustrates a specific example of the execution of a portion of an application in sandbox environment 126. In sandbox environment 126 code 148 can obtained from an application in training set 124. The code can be executed in sandbox environment 126 and allowed to run. If the code is a function call, then the call is hooked and the arguments are logged. For example, the arguments from the function call in a system stack 150 may be determined and logged. The data logged for each function call can include the name and library of the system function, the actual parameters passed into the system functions (e.g., input parameters), as well as parameters returned from the function (e.g., output parameters). The logged data can then be processed (e.g., by data mining module 130, normalization and generalization module 132, and transformation module 134) and used to populate emulation table 120.

Turning to FIG. 4, FIG. 4 is a simplified diagrams of a portion of a communication system for the simulation of an application in accordance with an embodiment of the present disclosure. Emulation table 120 can include a library column 136, a function column 138, an input parameter conditions column 140, and an output parameter actions column 142.

At runtime, emulation module 118 can access emulation table 120, check whether a table entry's list of input parameter condition matches the current simulation environment set, and if so, perform the output actions encoded in that table entry. The input parameters can include, variables, calls, system configuration, operating system, file configurations, data structures, etc. The current simulation environment is the environment where the application would run if the application were allowed to run or execute. For a proper simulation of the execution of an application, the table entry's list of input parameter should match the environment where the application would run if the application were allowed to run or execute. For example, as illustrated in FIG. 4, if the input parameters for the function "GetSomeHandleA" in mylib32.dll is 8, then the output parameters or action is to write "22" into stack[0] pointer, and set EAX to 1. If the input parameters for the function "GetSomeHandleA" in mylib32.dll is 32, then the output parameters or action is to write "0" into stack[0] pointer, and set EAX to 0. This allows emulation module 118 to simulate running an application without having to actually run the application and to use data-mining and machine-learning strategies to automatically model the relevant simulation logic for a profiled operating environment.

Figure 5:
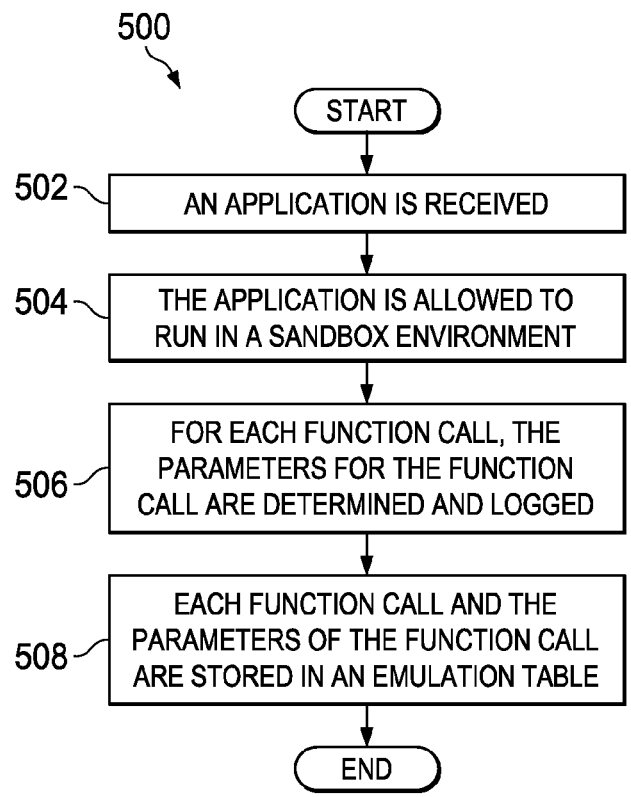
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with the simulation of an application, in accordance with an embodiment. In an embodiment, one or more operations of flow 500 may be performed by emulation data assessor 146 and network security module 122. At 502, a application is received (or identified) by a system. For example, the application may be received from training set 124. Training set 124 can include a large batch of applications or processes and the system may receive a randomly selected an application from training set 124, a known malware sample from training set 124, or an administrator may select an application to received. At 504, the application is allowed to run in a sandbox environment. For example, the application may be allowed to run in sandbox environment 126. At 506, for each function call, the parameters for the function call are determined and logged. At 508, each function call and the parameters of the function call are stored in an emulation table.

Figure 6:
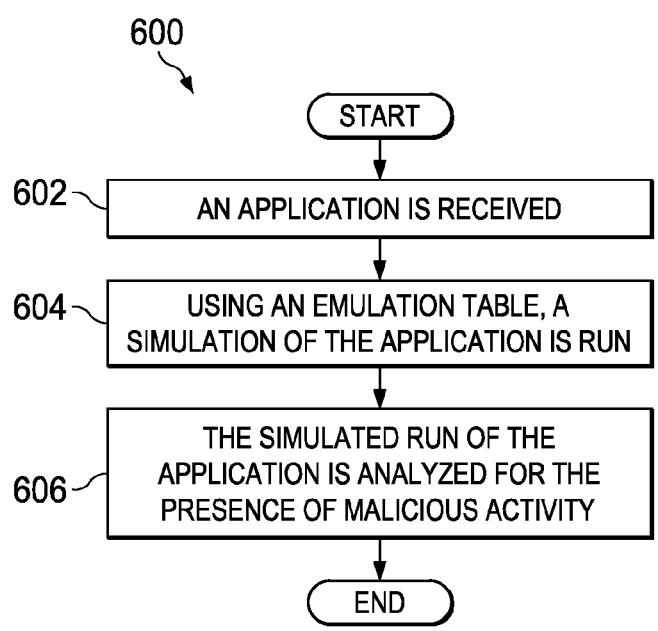
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with the simulation of an application, in accordance with an embodiment. In an embodiment, one or more operations of flow 600 may be performed by emulation module 118. At 602, an application is received (or identified) by a system. For example, the application may be received from training set 124. At 604, using an emulation table, a simulation of the application is run. At 606, the simulated run of the application is analyzed for the presence of malicious activity.

Figure 7:
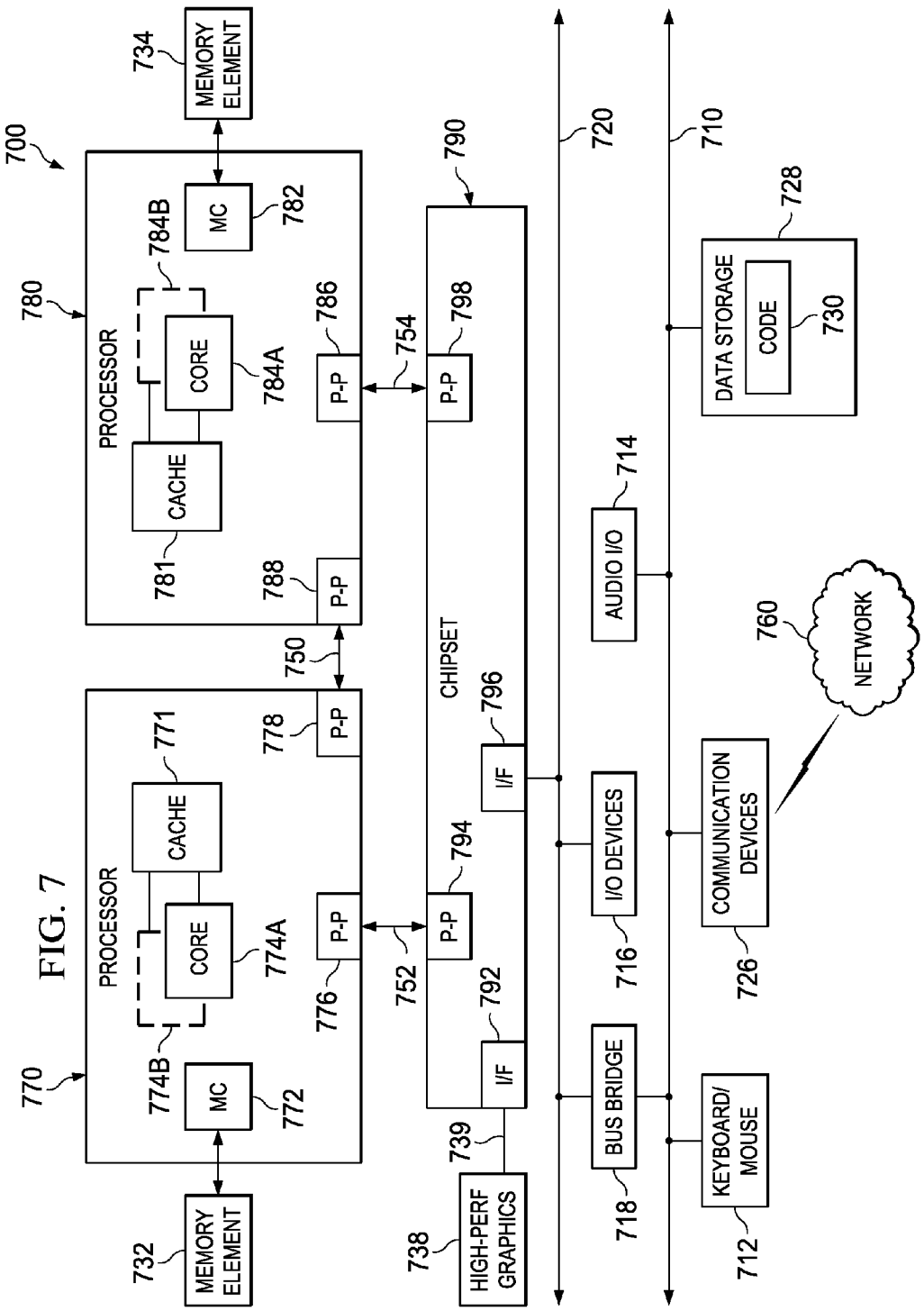
FIG. 7 is a block diagram illustrating an example computing system that is arranged in a point-to-point configuration in accordance with an embodiment.

FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the network elements of communication system 10 may be configured in the same or similar manner as computing system 700.

As illustrated in FIG. 7, system 700 may include several processors, of which only two, processors 770 and 780, are shown for clarity. While two processors 770 and 780 are shown, it is to be understood that an embodiment of system 700 may also include only one such processor. Processors 770 and 780 may each include a set of cores (i.e., processor cores 774A and 774B and processor cores 784A and 784B) to execute multiple threads of a program. The cores may be configured to execute instruction code in a manner similar to that discussed above with reference to FIGS. 1-6. Each processor 770, 780 may include at least one shared cache 771, 781. Shared caches 771, 781 may store data (e.g., instructions) that are utilized by one or more components of processors 770, 780, such as processor cores 774 and 784.

Processors 770 and 780 may also each include integrated memory controller logic (MC) 772 and 782 to communicate with memory elements 732 and 734. Memory elements 732 and/or 734 may store various data used by processors 770 and 780. In alternative embodiments, memory controller logic 772 and 782 may be discrete logic separate from processors 770 and 780.

Processors 770 and 780 may be any type of processor and may exchange data via a point-to-point (PtP) interface 750 using point-to-point interface circuits 778 and 788, respectively. Processors 770 and 780 may each exchange data with a chipset 790 via individual point-to-point interfaces 752 and 754 using point-to-point interface circuits 776, 786, 794, and 798. Chipset 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Chipset 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 8:
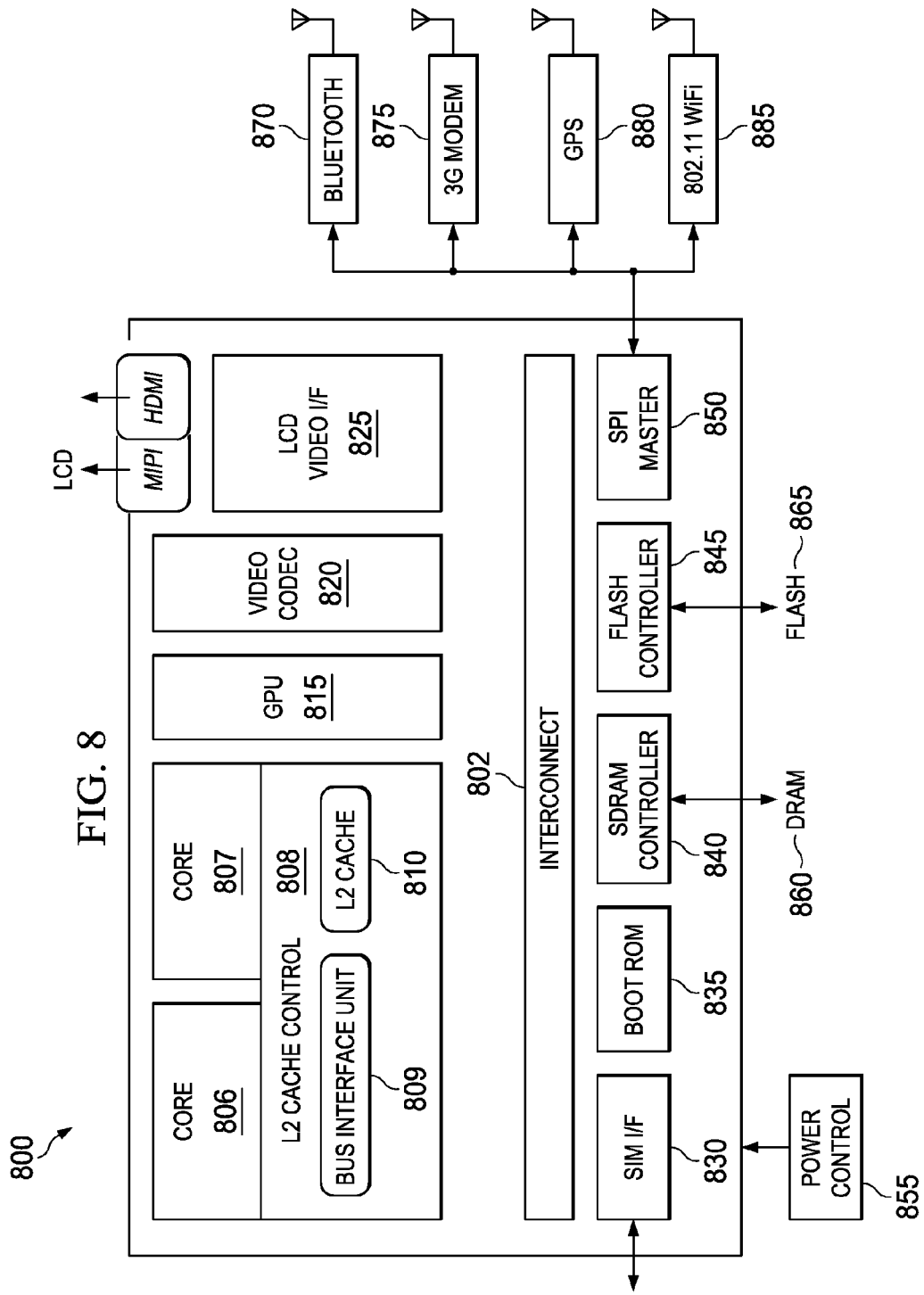
FIG. 8 is a simplified block diagram associated with an example ARM ecosystem system on chip (SOC) of the present disclosure.

Turning to FIG. 8, FIG. 8 is a simplified block diagram associated with an example ARM ecosystem SOC 800 of the present disclosure. At least one example implementation of the present disclosure can include the simulation of an application features discussed herein and an ARM component. For example, the example of FIG. 8 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LCD.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more example embodiments include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 9:
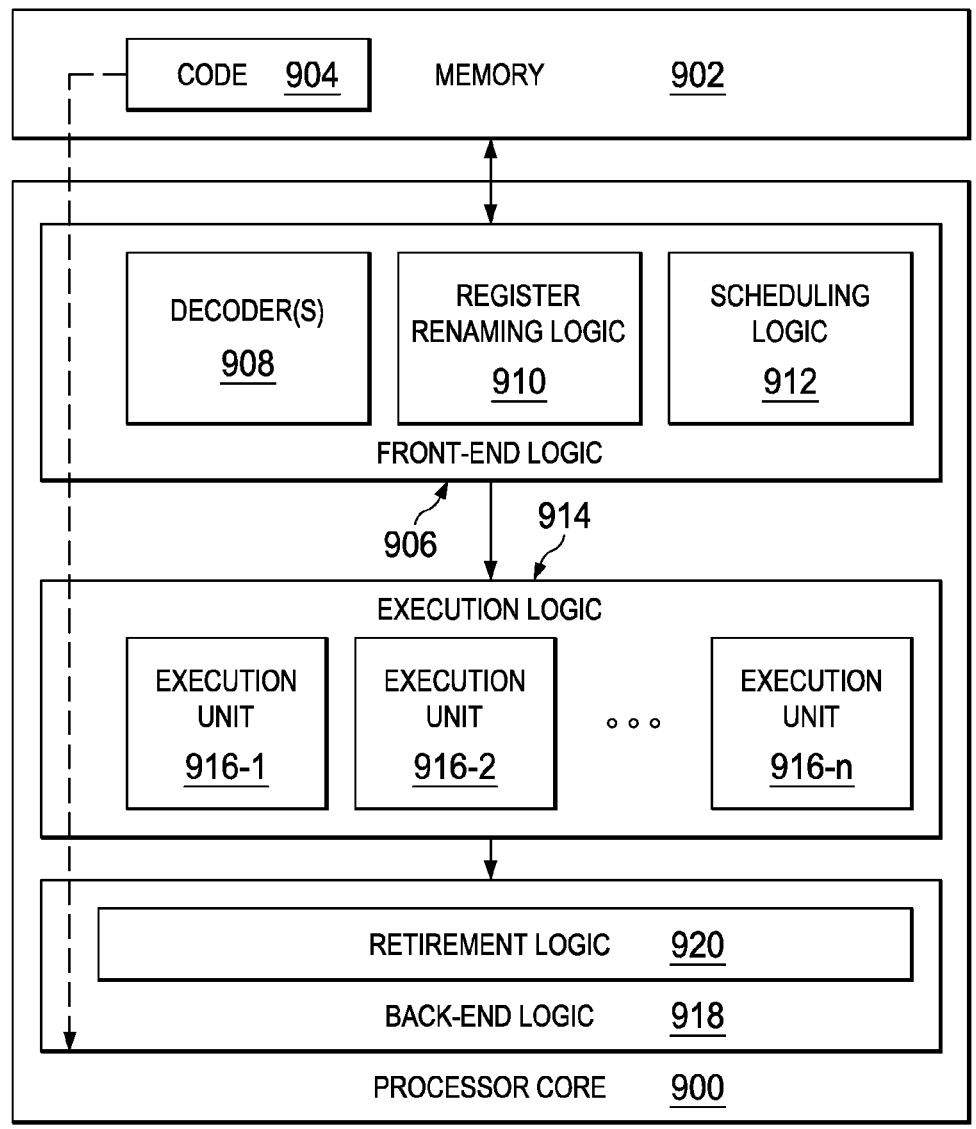
FIG. 9 is a block diagram illustrating an example processor core in accordance with an embodiment.

FIG. 9 illustrates a processor core 900 according to an embodiment. Processor core 900 may be the core for any type of processor, such as a micro-processor, an embedded processor, a digital signal processor (DSP), a network processor, or other device to execute code. Although only one processor core 900 is illustrated in FIG. 9, a processor may alternatively include more than one of the processor core 900 illustrated in FIG. 9. For example, processor core 900 represents one example embodiment of processors cores 774a, 774b, 784a, and 784b shown and described with reference to processors 770 and 780 of FIG. 7. Processor core 900 may be a single-threaded core or, for at least one embodiment, processor core 900 may be multithreaded in that it may include more than one hardware thread context (or "logical processor") per core.

FIG. 9 also illustrates a memory 902 coupled to processor core 900 in accordance with an embodiment. Memory 902 may be any of a wide variety of memories (including various layers of memory hierarchy) as are known or otherwise available to those of skill in the art. Memory 902 may include code 904, which may be one or more instructions, to be executed by processor core 900. Processor core 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor core 900 can also include execution logic 914 having a set of execution units 916-1 through 916-N. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor core 900 allows out of order execution but requires in order retirement of instructions. Retirement logic 920 may take a variety of known forms (e.g., re-order buffers or the like). In this manner, processor core 900 is transformed during execution of code 904, at least in terms of the output generated by the decoder, hardware registers and tables utilized by register renaming logic 910, and any registers (not shown) modified by execution logic 914.

Although not illustrated in FIG. 9, a processor may include other elements on a chip with processor core 900, at least some of which were shown and described herein with reference to FIG. 7. For example, as shown in FIG. 7, a processor may include memory control logic along with processor core 900. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 5 and 6) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 9 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 9 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor cause the at least one at least one machine readable medium to identify an application, run the application, log the parameters for each function call of the application, and store the logged parameters in an emulation table.

In Example C2, the subject matter of Example C1 can optionally include where the logged parameters include a function call, input parameters, and output parameters.

In Example C3, the subject matter of any one of Examples C1-C2 can optionally include where the instructions, when executed by the at least one processor, further cause the at least one machine readable medium to assess overall logging data and determine the most prevalent combinations of input to output parameter mappings for each function call.

In Example C4, the subject matter of any one of Examples C1-C3 can optionally include where the instructions, when executed by the at least one processor, further cause the at least one machine readable medium to prune out any parameters that do not influence the output of each function call.

In Example C5, the subject matter of any one of Examples C1-C4 can optionally include where data in the emulation table includes a mapping table per function call that can be interpreted at runtime by an emulation module.

In Example C6, the subject matter of any one of Example C1-05 can optionally include where the emulation table includes a plurality of logged parameters for a plurality of function calls.

In Example C7, the subject matter of any one of Examples C1-C6 can optionally include where the instructions, when executed by the at least one processor, further cause the at least one processor to communicate the emulation table to an electronic device.

In Example C8, the subject matter of any one of Examples C1-C7 can optionally include where the application is ran in a sandbox environment.

In Example A1, an apparatus can include a network emulation module, where the network emulation module is configured to identify an application, run the application, log the parameters for each function call of the application, and store the logged parameters in an emulation table.

In Example, A2, the subject matter of Example A1 can optionally include where the logged parameters include a function call, input parameters, and output parameters.

In Example A3, the subject matter of any one of Examples A1-A2 can optionally include where the network emulation module is further configured to assess overall logging data and determine the most prevalent combinations of input to output parameter mappings for each function call.

In Example A4, the subject matter of any one of Examples A1-A3 can optionally include where the network emulation module is further configured to prune out any parameters that do not influence the output of the function call.

In Example A5, the subject matter of any one of Examples A1-A4 can optionally include where data in the emulation table includes a mapping table per function call that can be interpreted at runtime by an emulation module.

In Example A6, the subject matter of any one of Examples A1-A5 can optionally include where the emulation table includes a plurality of logged parameters for a plurality of function calls.

In Example A7, the subject matter of any one of Examples A1-A6 can optionally include where the monitoring module is further configured to communicate the emulation table to an electronic device.

In Example A8, the subject matter of any one of Examples A1-A7 can optionally include where the monitoring module is further configured to run the application in a sandbox environment.

Example M1 is a method including identifying an application on an electronic device and simulating an execution of the application using an emulation table, wherein the emulation table includes parameters for each function call of the application.

In Example M2, the subject matter of Example M1 can optionally include where the parameters include input parameters and output parameters.

In Example M3, the subject matter of any one of the Examples M1-M2 can optionally include analyzing the simulation of the execution of the application for the presence of malware.

In Example M4, the subject matter of any one of the Examples M1-M3 can optionally include data in the emulation table includes a mapping table per function call that can be interpreted at runtime by an emulation module.

In Example M5, the subject matter of any one of the Examples M1-M4 can optionally include where the emulation table was created by a network element and communicated from the network element to the electronic device.

In Example M6, the subject matter of any one of the Examples M1-M5 can optionally include where the emulation table was created by identifying an application, running the application, logging the parameters for each function call of the application, and storing the logged parameters in an emulation table.

In Example M7, the subject matter of any one of the Examples M1-M6 can optionally include where during creation of the emulation table, logging data was assessed and the most prevalent combinations of input to output parameter mappings for each function call was determined.

Example S1 is a system for the simulation of an application, the system including a network emulation module configured to identify an application, run the application, log the parameters for each function call of the application, and store the logged parameters in an emulation table.

In Example S2, the subject matter of Example S1 can optionally include where the logged parameters include a function call, input parameters, and output parameters.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine-readable medium comprising one or more instructions that when executed by at least one processor, cause the at least one processor to:
    run an application in a sandbox environment, wherein the application includes a plurality of function calls;
    log parameters for each function call of the application during run time in the sandbox environment, wherein the logged parameters include each function call, input parameters for each function call, and output parameters for each function call;
    store the logged parameters in an emulation table; and
    use the logged parameters in a simulation environment to simulate execution of a function call of the plurality of function calls, wherein simulating execution of the function call comprises simulating the function call without having to run the function call by:
        determining from the emulation table whether a current simulation environment parameter set for the function call matches logged input parameters for the function call; and
        in response to determining the current simulation environment parameter set matches logged input parameters, returning the logged output parameters for the function call.

2. The at least one non-transitory machine-readable medium of claim 1, further comprising one or more instructions that when executed by the at least one processor, further cause the at least one processor to:
    assess overall logging data and determine prevalent combinations of input to output parameter mappings for each function call.

3. The at least one non-transitory machine-readable medium of claim 2, further comprising one or more instructions that when executed by the at least one processor, further cause the at least one processor to:
    remove at least one parameter that does not influence an output of at least one of the function calls.

4. The at least one non-transitory machine-readable medium of claim 1, further comprising one or more instructions that when executed by the at least one processor, further cause the at least one processor to:
    communicate the emulation table to an electronic device.

5. An apparatus comprising:
    a network emulation module configured to:
        run an application in a sandbox environment, wherein the application includes a plurality of function calls;
        log parameters for each function call of the application during run time in the sandbox environment, wherein the logged parameters include each function call, input parameters for each function call, and output parameters for each function call;
        store the logged parameters in an emulation table; and
        use the logged parameters in a simulation environment to simulate execution of a function call of the plurality of function calls, wherein simulating execution of the function call comprises simulating the function call without having to run the function call by:
            determining from the emulation table whether a current simulation environment parameter set for the function call matches logged input parameters for the function call; and
            in response to determining the current simulation environment parameter set matches logged input parameters, returning the logged output parameters for the function call.

6. The apparatus of claim 5, wherein the network emulation module is further configured to:
    assess overall logging data and determine prevalent combinations of input to output parameter mappings for each function call.

7. The apparatus of claim 5, wherein the network emulation module is further configured to:
    prune out parameters that do not influence an output of each function call.

8. The apparatus of claim 7, wherein the network emulation module is further configured to:
    communicate the emulation table to an electronic device.

9. A method comprising:
    identifying an application on an electronic device, wherein the application includes a plurality of function calls;
    running the application in a sandbox environment;
    logging parameters for each function call of the application during run time in the sandbox environment, wherein the logged parameters include each function call, input parameters for each function call, and output parameters for each function call;
    storing the logged parameters in an emulation table; and
    simulating an execution of the application using the emulation table, wherein simulating execution of the application comprises simulating a function call of the plurality of function calls without having to run the function call by:
  determining from the emulation table whether a current simulation environment parameter set for the function call matches logged input parameters for the function call; and
  in response to determining the current simulation environment parameter set matches logged input parameters, returning the logged output parameters for the function call.

10. The method of claim 9, further comprising:
analyzing the simulation of the execution of the application for the presence of malware.

11. The method of claim 9, wherein simulating the execution of the application using the emulation table is performed on the electronic device.

12. A system for the simulation of an application, the system comprising:
  a network emulation module configured to:
    run an application in a sandbox environment, wherein the application includes a plurality of function calls;
    log parameters for each function call of the application during run time in the sandbox environment, wherein the logged parameters include each function call, input parameters for each function call, and output parameters for each function call;
    store the logged parameters in an emulation table; and
  use the logged parameters in a simulation environment to simulate execution of a function call of the plurality of function calls, wherein simulating execution of the function call comprises simulating the function call without having to run the function call by:
    determining from the emulation table whether a current simulation environment parameter set for the function call matches logged input parameters for the function call; and
    in response to determining the current simulation environment parameter set matches logged input parameters, returning the logged output parameters for the function call.

* * * * *